(12) United States Patent
Dini et al.

(10) Patent No.: US 9,843,760 B2
(45) Date of Patent: Dec. 12, 2017

(54) VIDEO STREAM COMPOSED OF COMBINED VIDEO FRAMES AND METHODS AND SYSTEMS FOR ITS GENERATION, TRANSMISSION, RECEPTION AND REPRODUCTION

(75) Inventors: Roberto Dini, None (IT); Paolo D'Amato, None (IT); Saverio Celia, None (IT)

(73) Assignee: S.I.SV.EL SOCIETA ITALIANA PER LO SVILUPPO DELL'ELETTRONICA S.P.A. (IT)

( * ) Notice: Subject to any disclaimer, the term of this patent is extended or adjusted under 35 U.S.C. 154(b) by 502 days.

(21) Appl. No.: 13/980,561

(22) PCT Filed: Jan. 10, 2012

(86) PCT No.: PCT/IT2012/000009
§ 371 (c)(1),
(2), (4) Date: Jul. 18, 2013

(87) PCT Pub. No.: WO2012/098567
PCT Pub. Date: Jul. 26, 2012

(65) Prior Publication Data
US 2013/0307942 A1    Nov. 21, 2013

(30) Foreign Application Priority Data
Jan. 19, 2011    (IT) .............................. TO2011A0035

(51) Int. Cl.
*H04N 5/45*    (2011.01)
*H04N 5/445*    (2011.01)
(Continued)

(52) U.S. Cl.
CPC ........... *H04N 5/45* (2013.01); *H04N 5/44591* (2013.01); *H04N 13/0048* (2013.01);
(Continued)

(58) Field of Classification Search
CPC ........... H04N 13/0048; H04N 13/0059; H04N 21/23439; H04N 21/2347;
(Continued)

(56) References Cited

U.S. PATENT DOCUMENTS 3,752,911 A * 8/1973 Morchand .............. H04N 7/015
348/426.1
5,784,461 A * 7/1998 Shaffer .............. H04N 1/00137
355/18

(Continued)

FOREIGN PATENT DOCUMENTS

EP    0 883 300 A2    12/1998
WO   2009/081335 A1    7/2009

OTHER PUBLICATIONS

International Search Report dated Apr. 2, 2012, issued in PCT Application No. PCT/IT2012/000009 filed Jan. 10, 2012.

*Primary Examiner* — Peter D Le
(74) *Attorney, Agent, or Firm* — Workman Nydegger

(57) ABSTRACT

A video stream composed of combined video frames having a first resolution and include in their entirety two contents usable through extraction from the aforesaid video frame: a first content belonging to a video stream (F1) at a second resolution lower than the first resolution of the frame; and, in the area of the frame formed by the remaining pixels, at least a second content belonging to an information stream (F2) having, in the case where it is also a video stream, a resolution equal to or less than the second resolution, where during the fruition of one of the two video streams it is shown full-screen in its entirety, or in the case of a data information stream, data encoded via a set of pixels, the number of which is less than or equal to the number of pixels left free by the first video stream.

20 Claims, 5 Drawing Sheets

(51) Int. Cl.
*H04N 13/00* (2006.01)
*H04N 21/431* (2011.01)
*H04N 21/81* (2011.01)
*H04N 21/2343* (2011.01)
*H04N 21/2347* (2011.01)
*H04N 21/236* (2011.01)
*H04N 21/2365* (2011.01)
*H04N 21/426* (2011.01)
*H04N 21/434* (2011.01)
*H04N 21/4405* (2011.01)
*H04N 21/854* (2011.01)

(52) U.S. Cl.
CPC ..... *H04N 13/0059* (2013.01); *H04N 21/2347* (2013.01); *H04N 21/2365* (2013.01); *H04N 21/23439* (2013.01); *H04N 21/23614* (2013.01); *H04N 21/42653* (2013.01); *H04N 21/4316* (2013.01); *H04N 21/4347* (2013.01); *H04N 21/4348* (2013.01); *H04N 21/4405* (2013.01); *H04N 21/816* (2013.01); *H04N 21/85406* (2013.01)

(58) Field of Classification Search
CPC ......... H04N 21/23614; H04N 21/2365; H04N 21/42653; H04N 21/4316; H04N 21/4347; H04N 21/4348; H04N 21/4405; H04N 21/816; H04N 21/85406
See application file for complete search history.

(56) References Cited

U.S. PATENT DOCUMENTS

| | | | | |
|---|---|---|---|---|
| 5,832,124 A * | 11/1998 | Sato | ....................... | H04N 19/30 348/445 |
| 5,933,499 A * | 8/1999 | Enari | ................... | H04N 7/1675 348/E7.056 |
| 6,009,236 A * | 12/1999 | Mishima | ................ | H04N 19/59 375/E7.026 |
| 6,496,607 B1 * | 12/2002 | Krishnamurthy | ...... | H04N 19/46 375/E7.082 |
| 6,525,775 B1 * | 2/2003 | Kahn | ........................ | G06F 8/65 348/460 |
| 7,463,736 B2 * | 12/2008 | Tagashira | ....... | H04N 21/234327 380/210 |
| 2003/0039465 A1 * | 2/2003 | Bjorgan | ............... | G11B 27/034 386/251 |
| 2003/0219081 A1 * | 11/2003 | Sheehan | ............ | H04N 21/2362 375/316 |
| 2004/0081334 A1 * | 4/2004 | Hayashi | ................ | H04L 9/0836 382/100 |
| 2004/0141613 A1 * | 7/2004 | Hayashi | .................... | H04K 1/00 380/28 |
| 2005/0078820 A1 * | 4/2005 | Hayashi | ................... | H04K 1/00 380/37 |
| 2006/0156352 A1 * | 7/2006 | Smith | .................... | H04N 7/167 725/86 |
| 2007/0258588 A1 | 11/2007 | Ogata | | |
| 2007/0296826 A1 * | 12/2007 | Kimura | .............. | H04N 5/23293 348/222.1 |
| 2008/0077701 A1 * | 3/2008 | Kongalath | .............. | H04L 12/18 709/232 |
| 2008/0094427 A1 * | 4/2008 | Debonnet | .............. | G09G 5/008 345/698 |
| 2008/0187045 A1 * | 8/2008 | Marquant | ............... | H04N 19/63 375/240.16 |
| 2009/0172754 A1 * | 7/2009 | Furukawa | .............. | H04N 5/765 725/91 |
| 2010/0008421 A1 * | 1/2010 | Gutman | ................. | H04N 19/40 375/240.16 |
| 2010/0211988 A1 * | 8/2010 | Pettit | .................. | H04N 21/4122 725/134 |
| 2011/0093911 A1 * | 4/2011 | Szucs | ..................... | H04N 7/173 725/118 |
| 2011/0096069 A1 * | 4/2011 | Redmann | ........... | H04N 13/0029 345/419 |
| 2011/0181694 A1 * | 7/2011 | Kim | .................... | H04N 13/0048 348/43 |
| 2011/0249757 A1 * | 10/2011 | Newton | ............... | H04N 13/004 375/240.25 |
| 2012/0033039 A1 * | 2/2012 | Sasaki | ................ | H04N 13/0029 348/43 |
| 2012/0081515 A1 * | 4/2012 | Jang | ........................ | H04N 5/45 348/43 |
| 2012/0293619 A1 * | 11/2012 | Newton | ............... | H04N 9/8042 348/43 |

\* cited by examiner

| Sigla | Nome | Larghezza | Altezza |
|---|---|---|---|
| CGA | Computer Graphics Array | 320 | 200 |
| EGA | Enhanced Graphics Array | 640 | 350 |
| VGA | Video Graphics Array | 640 | 480 |
| NTSC TV | National Television System Committee TV | 720 | 480 |
| PAL TV | Phase Alternating Line TV | 720 | 576 |
| SVGA | Super Video Graphics Array | 800 | 600 |
| XGA | eXtended Graphics Array | 1024 | 768 |
| XGA+ | eXtended Graphics Array Plus | 1152 | 864 |
|  |  | 1280 | 600 |
| HDTV | High Definition Television (HD Ready) | 1280 | 720 |
| WXGA | Widescreen eXtended Graphics Array | 1280 | 768 |
| WXGA | Widescreen eXtended Graphics Array | 1280 | 800 |
|  |  | 1280 | 854 |
| SXGA (UVGA) | Super eXtended Graphics Array | 1280 | 960 |
| SXGA | Super eXtended Graphics Array | 1280 | 1024 |
| WXGA | Wide XGA resolution | 1360 | 768 |
| WSXGA | Widescreen Super eXtended Graphics Array | 1440 | 900 |
| HD+ | High Definition Plus | 1600 | 900 |
| UXGA | Ultra eXtended Graphics Array | 1600 | 1200 |
| WSXGA+ | Widescreen Super eXtended Graphics Array + | 1680 | 1050 |
| HDTV | High Definition Television (Full HD) | 1920 | 1080 |
| WUXGA | Widescreen Ultra eXtended Graphics Array | 1920 | 1200 |

FIG. 5

VIDEO STREAM COMPOSED OF COMBINED VIDEO FRAMES AND METHODS AND SYSTEMS FOR ITS GENERATION, TRANSMISSION, RECEPTION AND REPRODUCTION

BACKGROUND OF THE INVENTION

1. Field of the Invention

The present invention relates to a video stream composed of combined video frames and to a method and systems for the generation, transmission, reception and reproduction of combined video streams.

2. Present State of the Art

With the advent of digital TV, a multitude of digital television studios have appeared that crowd the wavebands assigned to television transmissions. On the other hand, it is possible and sometimes necessary to transmit encrypted TV programmes and also software updates for the various makes and models of television receivers (televisions, set-top boxes and video cassette recorders). The airwaves thus become crowded with signals and so it is necessary to try to transmit the greatest number of services possible (television or otherwise, free-to-air or encrypted) in the least possible number of channels, without being obliged to change content production and distribution infrastructures (production studios and broadcasting stations) and still less the television receivers currently in the home or on the market, the majority of which are by now capable of handling Full HD television signals (1920×1080 pixels). The optimal solution is the one that, for the same bandwidth, increases the television services produced and distributed by the broadcasters and consumed by viewers without any changes being needed in the home.

It is already known to transmit a stereoscopic 3D television programme by forming the two images, left and right, of the same shot in a single Full HD (Hugh Definition) frame in systems known as "frame compatible", i.e. in a mode that is backward compatible with existing HD decoders (integrated or otherwise). The common ones are Side-by-Side or Top-Bottom, with the two images positioned in the HD frame of 1920×1080 pixels as indicated (side-by-side or one at the top and one at the bottom). The alternative systems are called "service compatible"; they are currently used only for Blu-ray readers and can in no way be used for the broadcasting of television signals on existing infrastructures.

These systems permit their distribution over already existing HD TV broadcasting infrastructures and the signals can be displayed on 3D TV receivers. However, traditional (2D) HD receivers display the two images side by side or superimposed, as can be verified, for example, with digital terrestrial broadcasting in Italy in the switch-off areas for the LA7 3D test channel, programmed with LCN (logical channel numbering) 529, which uses side-by-side.

Sisvel Technology has developed and patented its own "frame compatible" system, known as "tile format", where a 2D HD television receiver that respects the MPEG4 standard can display the 3D television signal in two-dimensional mode without any changes to the receiver, downscaling the image resolution from the maximum possible image quality (HD ready, i.e. 1280×720 pixels).

The Applicant does not know of similar solutions for the same technical problem, other than using separate channels or video streams to distribute information streams or multimedia files by means of broadcasting or separate memory media.

SUMMARY OF THE INVENTION

The object of the present invention is to resolve the above-stated problems of the prior art, providing a method and a system for the generation, transmission/reception and reproduction of combined video streams that adopt the solutions described henceforth.

The above object and other objects and advantages of the invention, as shall emerge from the following description, are achieved with a video stream composed of combined video frames and a method and systems for its generation, transmission, reception and reproduction, as described in the respective claims. Preferred embodiments and non-obvious variants of the present invention form the subject-matter of the dependent claims.

It is understood that all the appended claims form an integral part of the present description.

BRIEF DESCRIPTION OF THE DRAWINGS

The present invention will now be better described by some preferred embodiments, provided by way of non-limitative example and with reference to the attached drawings, where:

FIG. 5 shows a list of the most important resolutions used for video images.

DETAILED DESCRIPTION OF THE PREFERRED EMBODIMENTS

Presumably, there will be a long period of transition from 2D to 3D in which broadcasters will start to transmit 3D content during certain hours of the day, typically those of peak viewing time, presumably in "frame compatible" mode in alternation with 2D content or test signals, both for the scarce availability of 3D content and the small number of viewers able to display 3D content. In addition, it might often be necessary to carry out updates on the receivers for various reasons, such as the need to adapt them to 3D content distribution modes and the services offered could vary frequently during the transition from 2D to 3D television. Furthermore, it is also possible that together with 3D content the broadcaster offers 2D paid content that must only be viewable by authorized users, for example at certain times during the day or night, transmitted simultaneously or otherwise with free-to-air 2D content accessible to all users.

The inventive concept consists in inserting a 2D image at a lower resolution than (full) HD, for example HD ready (typically 1280×720 pixel), in the same Full HD video frame and in inserting information independent of this content, normally coming from the same source (a broadcaster such as the Italian RAI) or network providers (for example, SKY or ASTRA), in the area formed by the remaining pixels. The joining of HD video frames made in this way constitutes a full-HD video stream comprising two information streams, one composed of a two-dimensional video stream and the other of an information video stream, the content of which is independent of the first stream.

Figure 1:
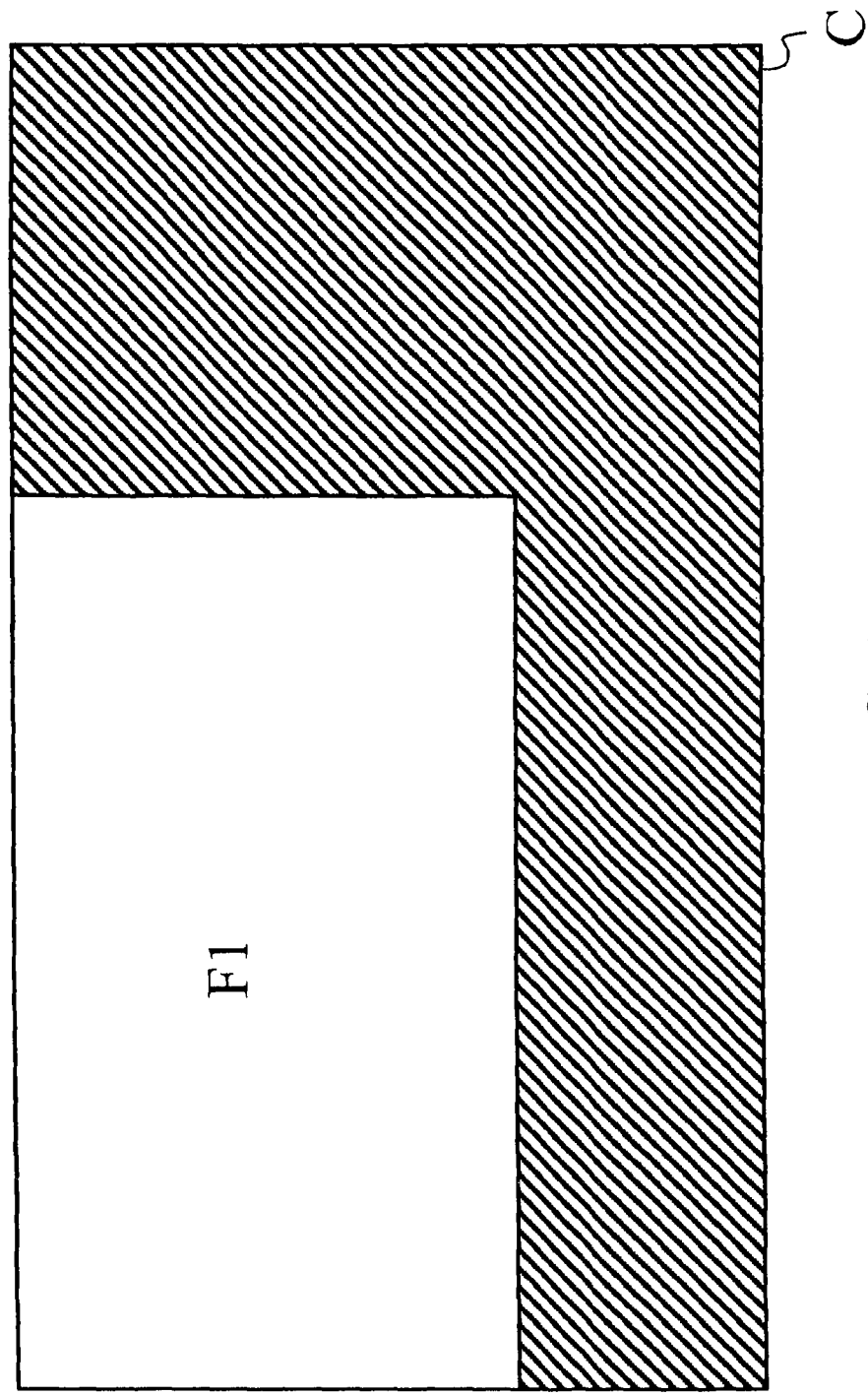
FIG. 1 shows an example of a, video frame belonging to a video stream to which the present invention is applied.

With reference to FIG. 1, F1 indicates the area occupied by the 2D image in HD Ready format, while the hatched region contains the information independent of the 2D image. This information can consist of, for example, the content of an encrypted video and only be accessible in the presence of an opportune decryption system (for example, a CAM module and associated smart card for descrambling), or video on demand content destined for users who have taken out a subscription and consequently have the right to receive pay-tv content.

Alternatively, this information could consist of software updates for the TV receivers supplied by a network provider or a television receiver manufacturer.

All of this takes place simultaneously, without the need to occupy two channels for video streams, in the case of a 2D video stream and an encrypted video stream or a video stream and a data stream (for example, a DVB service) in the other case.

In this way, the broadcaster can maximize transmission capacity utilization. In addition, a television receiver compatible with the system and the video stream according to the invention can simultaneously receive 2D content of optimal quality, as it has a greater resolution than the standard one, and a second video content, always generated with the Tile Format technique, encrypted or on demand, which can be displayed on a second screen external to the set, on another screen of another set, always tuned to the same video stream, but controlled to supply the second information stream independent of the first, or as PIP (picture in picture) or PAP (picture and picture) on the same screen of the main 2D image, or recorded on storage media (hard disk, CD/DVD Blu-ray, flash memory, etc.) for subsequent viewing.

In the case of inserting software updates, once extracted from the HD video frames, this data can be stored and subsequently applied automatically or after approval of the user of the TV receiver. All of this happens simultaneously with the same production system on one side and the reception and/or reproduction system on the other.

In the case of a TV receiver equipped with only one screen, one could consider leaving the user with the possibility of choosing one of the two video streams to display on the screen as desired.

Figure 2:
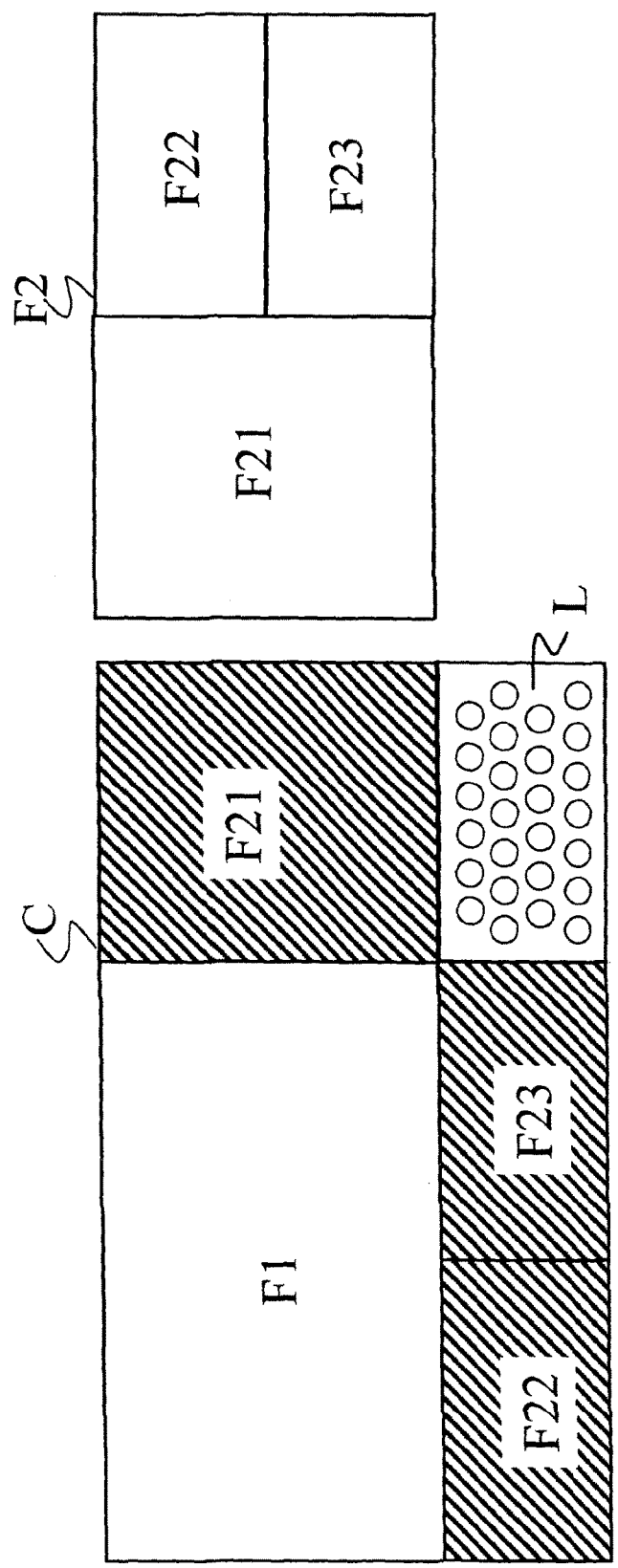
FIG. 2 shows another example of a video frame belonging to a video stream to which the present invention is applied.

Another possibility is that of transmitting in the hatched area in FIG. 1, alternately in time as components of the second information stream independent of the first, the two images forming the 3D stereoscopic pair in HD ready resolution split into three parts according to the Tile Format technique, as shown by way of example in FIG. 2 for video stream F2. If the Full HD video frame container has a repetition rate of 50 Hz, the additional secondary stream composed of the F2 frames would form a 25-Hertz 3D video stream with HD ready resolution, which matches perfectly with the video streams derived from cine film, which has a 24 Hz frame rate.

Thanks to opportune metadata inserted in the video stream in the encoding parameters during production of the video stream (the so-called "cropping window"), after possible decoding, it is possible to make a traditional 2D television receiver extract just, the 2D image from the (full) HD frame, ignoring the area of the frame comprising the additional information stream that, in any case, it would not be able to interpret and use.

Figure 3:
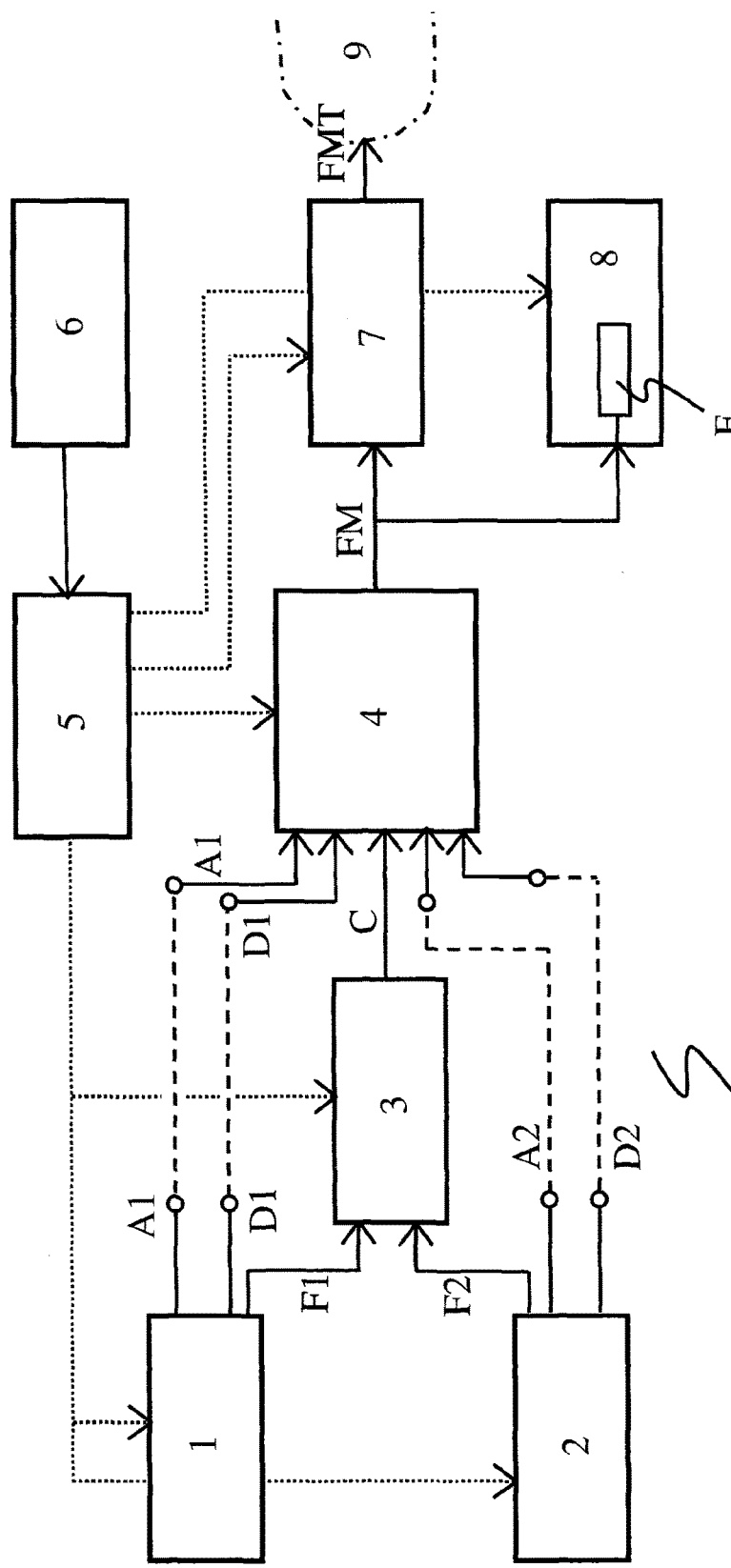
FIG. 3 shows a block diagram of a possible embodiment of a generation system for the video stream according to the present invention.

A video stream generation system 100 according to the invention (producer/recorder/capturer) is shown in FIG. 3. A first source 1 generates a 2D video stream F1 (for example 1280×720, although it could also be a standard definition video stream, i.e. 720×576 pixels, or lower, for example 640×480 VGA, and so on).

Source 1 can be a telecamera, a video stream stored in and extracted from a video archive, etc. The additional information stream source 2 generates the second stream F2 that is to be combined. This can be a second video stream completely independent of the first (for example, a second video coming from another television studio, video archive, etc.), and can be encrypted according to any known or future method of encryption. Depending on the resolution of this second video stream, it might be necessary to split the images that form it into various parts, as shown for example in FIG. 2 for an HD ready resolution where the images of the second stream F2 are split into three parts and possibly encrypted (the hatching indicating this operation) before being arranged in the composite Full HD video frame C. This is only a particular case, as the two streams could also have different resolutions, both encrypted or both free-to-air, as long as they are independent and have dimensions such that they can be fitted in a (full) HD frame. Video stream F1 has a lower resolution with respect to that of the video frame container C, while video stream F2 has a resolution lower than or at most equal to that of F1.

The secondary/additional video stream can also be a video-on-demand type of content or, in any case, be part of a pay-tv service, which a given service provider intends to circularly distribute to everyone who has taken out a special subscription and, if necessary, possesses a television receiver (for example, a set top box) compatible with the added-value pay-tv service (for example, Mediaset Premium).

In this way, the same model of set top box could receive and display just free content or also paid content according to the presence of opportune display unlocking mechanisms for paid content in the set top box; it is not necessary to purchase two separate set top boxes to simultaneously reproduce free content and paid content.

Furthermore, the transmission of both paid content and free content can take place simultaneously on the same television channel without having to occupy two channels, one for the distribution of free content and the other for paid content.

Consequently, it is not necessary to include two or more demodulation and decoding units to be able to simultaneously receive and display or store a multiplicity of multimedia streams transmitted on different channels.

In a second embodiment of the invention, especially useful in the case of remote data transmission, source 2 generates as output a software update regarding one or more television receivers that the broadcaster intends to update. The binary data that constitutes the software update is encoded via a set of pixels, the number of which is less than or equal to the number of pixels left free by the first video stream F1. Given that this concerns a sizeable amount of data, but of low priority, it can be provided with opportune redundancy to protect it from possible transmission errors due to interference or noise on the transmission channel.

Naturally, these software updates can regard one or more models, of the same or different makes, and can be cyclically transmitted according to a predefined schedule to ensure the maximum possible model coverage during the transmission times to reach the maximum possible number of receivers to be updated.

Furthermore, they can also be pre-processed to render them more "robust", i.e. highly impervious and resistant to compression operations, source encoding and channel encoding (modulation) that might be present in the video content production system provided in current infrastructures, as well as the related reverse operations of channel and source decoding present in the corresponding "consumption" system, i.e. in the receiver/player.

As an example of pre-processing to make the software updates resistant to MPEG 4 compression, each bit with a "0" (zero) value in the data to be transmitted could be made to correspond to a block opportunely positioned in the video frame C comprising 16×16 pixels with the same value, for example 0 (zero). When the bit to transmit is equal to 1, the 16×16 block comprises pixels with the maximum value, i.e. 255. The 16×16 blocks can be made to coincide with the macroblocks used in MPEG 4 compression. In this way, the compression methods of the standard are taken into account and it is possible to minimize the alterations introduced to the detriment of increasing the bandwidth necessary for transmission.

The decoder can, for example, calculate the average of each 16×16 block received and decide if the bit associated with the block is equal to 0 (zero) or 1 (one), according to whether the average pixel value in the block is less than/ equal to or greater than 127. By assigning a bit to each 16×16 pixel macroblock an image is obtained that is easily compressible and that enables protection of the software update's binary data "embedded" in the image. Since there are 8160 macroblocks in a 1920×1088 Full HD video frame, if approximately half of the macroblocks are allocated to data transmission, in the case of 1080i Full HD transmission at 50 Hz a bit rate of 4000 blocks×25 video frames per second=100 Kbit/sec, or 0.1 Mbit/s, is obtained. Assuming, for example, that a software update consists of a 10 Mbyte file, i.e. 80 Mbit: 80/0.1=800 seconds are necessary to transmit this file, the equivalent of 13 minutes and 20 seconds.

In addition, the file can be segmented into blocks and each block can be transmitted several times. In this way, if a block becomes corrupted due to transmission errors, this block can be substituted by exploiting its retransmission. In addition, to further reduce the possibility of modifications due to MPEG compression, the portion of the video frame comprising a certain set of binary data can be transmitted several times, for example for a number of frames equal to the GOP (Group of Pictures) provided by the MPEG 4 standard. Furthermore, it is possible to incorporate further redundancy by introducing mechanisms typical of code detectors and/or error correctors at block level, such as, for example, parity control blocks for a predefined series of consecutive blocks, or even more sophisticated mechanisms according to methods well known to experts in the field.

This condition ensures that the user system can reconstruct the software update data in output from source 2 with very high accuracy. Similar operations of adding redundancy and "strengthening" can be made on an encrypted video stream, which in general has not been designed for being split—if necessary—and inserted in a (full) HD frame, originally designed and standardized to contain information regarding free-to-air video sequences.

The composite video frame C output from the multiplexer 3 is compressed if necessary, in accordance with any one of the (source) video encoding standards (MPEG 4, VC-1, MPEG 2, etc.) and encapsulated in a container (Transport Stream TS, Program Stream PS, AVI, Matroska MKV, VOB, etc.) by an encapsulation unit 4. Further streams or signals (audio for example) and/or ancillary data (teletext, EPG data and MHP applications for, example) to be encapsulated in the container format can also be present at the input of this unit 4. For example, two audio streams A1 and A2 associated with the two video streams (the main one and the supplementary one) could be inserted in the container.

At this point, there are two alternatives. Either the multimedia video stream FM (2 audio-video streams (plus ancillary data) or 1 audio-video stream (plus ancillary data) and 1 software update) is stored in the form of a file F in a storage medium 8 (hard disk, flash memory, DVD, Blu-ray, etc.) for subsequent reproduction or transmission, or it is adapted (modulated) by a modulator 7 for being remotely transmitted in the form of a modulated multimedia stream FMT over any means of transmission 9, by cable (for example Internet) or over the air (digital terrestrial or satellite network), for example, in accordance with DVB standards (such as DVB-T/T2, DVB-S/S2, DVB-C/C2 and DVB-H).

In a possible variant, any splitting and encryption can also be performed by the multiplexer 3, which in this case would receive an unsplit free-to-air video stream.

In a second variant, multiplexer 3 and unit 4 are incorporated in the same processing unit.

The unit 4 opportunely inserts signal data in the container, for example, in the form of metadata that indicates the presence or absence of one or two information streams, their type (audio-video stream+ancillary data/software update/ video on demand), the modes in which they are presented in the composite multimedia stream C (for example the resolutions, dimensions and regions occupied by the streams, the presence or absence of encryption, the encryption standard, associated keys and so on). This signal data can be generated by a control unit 5 that coordinates and controls the operation of the entire system and of all the units present in FIG. 3; the signal and control lines are shown in FIG. 3 with dotted lines that run from the control unit 5 to the other units of the system 100. In turn, this control unit 5 could operate according to a microprogram that enables an operator to set the various composition modes of the HD frame. For example, as a result of a special command signal inserted in some way by the operator via a command unit (keyboard) 6 and passed to the control unit 5, the system 100 for generating the composite video stream C can produce the following types of composite video frame:

i) comprising images belonging only to one 2D video stream, in full HD format,
ii) comprising images belonging to two independent 2D video streams, both free-to-air, in HD Ready format,
iii) comprising images belonging to two independent 2D video streams, of which one is encrypted, in HD Ready format,
iv) comprising images belonging to two independent 2D video streams, both encrypted, in HD Ready format,
v) comprising images belonging to a 2D video stream and a software update,
vi) comprising two images belonging to a 3D video stream, in HD Ready format, according to the needs of the producer of the video content to be distributed. Therefore, the insertion of the second video information stream in the composite Full HD video frame C can also be disabled upon command (case i) or be substituted by images of a video dependent on the first, as they constitute the second shot of the stereoscopic pair (case vi).

In addition, audio signal sources (for example, sound tracks A1 and A2 for each corresponding video stream F1 and F2) can also be present in the system 100 for generating the multimedia stream (FM); these sources can be microphones for live recording systems, audio tracks of audio-visual multimedia files (FM), and so on. In addition, ancillary data sources D1 and D2 associated in some way with the audio-visual stream(s) (for example, teletext, EPG, MHP applications, etc.) can also be present, which the content producer has interest in making available to users in a manner associated with the audio-visual content. In this case, the encapsulation unit 4 will insert these audio signals A1 and A2 and also the ancillary data D1 and D2 in the container format according to standards that are predefined and known to the corresponding user-side reception and/or reproduction system 200. The dashed lines in FIG. 3 represent the connections that are entirely optional according to the invention, such as those regarding the audio A1 and A2 and ancillary data D1 and D2 streams.

Figure 4:
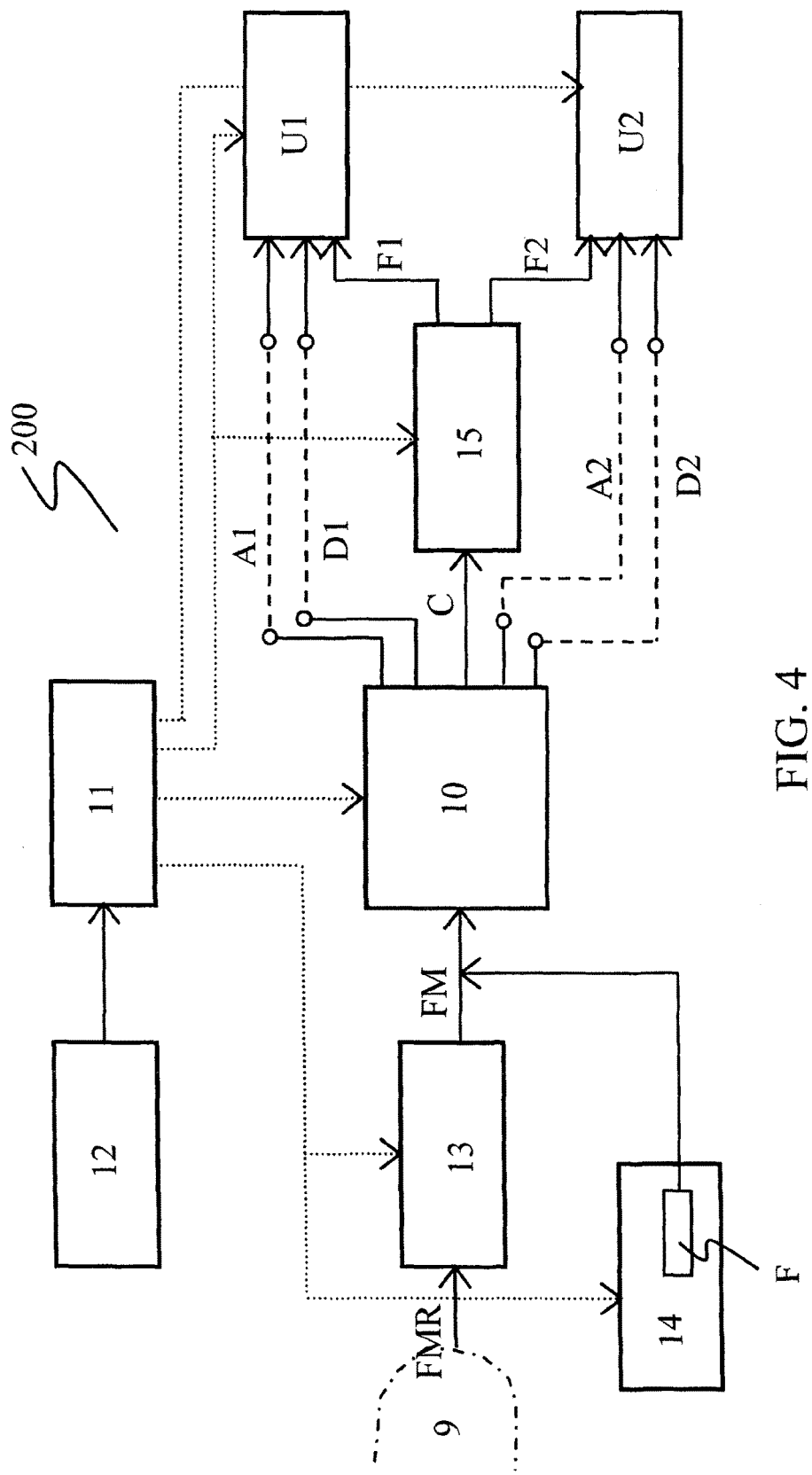
FIG. 4 shows a block diagram of a possible embodiment of a reception/reproduction system according to the present invention.

FIG. 4 represents the reception/reproduction system 200 according to the invention.

In the case of a remote reception system 200, this has a reception unit 13 that demodulates/decodes the composite multimedia stream FMR previously generated by the system 100 in FIG. 3 and transmitted over the means of transmission 9, performing the reverse operation of the unit for adapting the stream to the transmission channel (demodulation and channel decoding). In the case of only one reproduction system, this unit is not indispensable as the multimedia stream FM is stored in the form of a file F on a storage medium 14 locally accessible to the system.

The above-indicated stream FM is forwarded to a decapsulator and (source) decoder 10, which performs the operations of extracting the multimedia audio-video streams+ancillary data from the container format (decapsulation) and their possible source decoding to decompress the video and audio content and the ancillary data, which are then passed to the associated video, audio and data processing units. In particular, it restores the (full) HD frames forming the composite video stream, except for possible transmission or read/write errors, and extracts information inserted by the content production system concerning the format of the composite video stream C, if present. This can, for example, be provided directly to the video demultiplexer unit 15, which demultiplexes the two information streams F1 and F2 contained in the full HD frame and distributes them to the end users U1 and U2.

Alternatively, in an embodiment not shown in FIG. 4, the signal data is provided by unit 10 to a control unit 11 of the reception/reproduction system 200, which controls the operation of the demultiplexer unit 15 on the basis of the data values.

The main 2D video stream F1 extracted from the composite video stream C can, for example, be forwarded to a video processor U1 that reproduces the video content on a display screen incorporated in the reproduction system 200, or linked to it by any type of wired or wireless connection. The second information stream extracted from the frame F2 can be supplied to second means of video reproduction (combination of video processor and display screen) U2. If this second video stream is encrypted, means for decrypting this video stream can be present, with hardware (for example, a CAM module+enabled smart card) or with software stored in the system itself, activatable according to rules predetermined by the producer of the video stream and/or the manufacturer of the system. The above-indicated means of decryption (software or hardware) and the means of video reproduction for the secondary video stream can also reside on an external device linked to the reception/reproduction system 200 in whatever way (wired or wireless).

Alternatively, and not shown in FIG. 4, the secondary video stream could also be stored on any type of storage medium 14 (semiconductor, magnetic or optical memory) present in the reception and/or reproduction system 200 or in an external device linked to it, for subsequent viewing.

The two video streams F1 and F2 could even be forwarded to the means of video reproduction U1 and U2 in the form of two images combined on the screen according to the PIP (Picture in Picture) or PAP (Picture and Picture) modes that allow the user to see what IS simultaneously contained in the multimedia stream being processed and, if necessary, select what is to be reproduced and what is to be discarded or recorded locally or supplied to external equipment to be reproduced or recorded for subsequent viewing.

In this case as well, there is a command unit (keyboard and/or remote control) 12 linked to the control unit 11, which enables the user to adjust the system's modes of operation with regard to the methods by which use is made of the information streams extracted from the full HD frame being processed according to the functions implemented within it when they are both video streams, such as, for example:

displaying the two video streams in PIP or PAP on the incorporated screen (if present) or on the associated one;

displaying the main stream on the incorporated screen and storing the secondary one on a storage, medium (integrated in the system or on an external device);

displaying the main stream on the incorporated screen and re-routing the secondary one to an associated system;

displaying the main stream and discarding the secondary video stream as it is of no interest, or vice versa.

The decapsulator 10 of the receiver and/or reproducer system 200 can also extract the audio streams A1 and A2 and the ancillary data D1 and D2 associated with the video streams present in the multimedia stream being processed and supply them to the user systems U1 and U2, which can process them and use them in the planned manner; hence, for example, the audio streams A1 and A2 can be reproduced together with the corresponding video streams to which they are associated, and the ancillary data D1 and D2 (for example, teletext, EPG or MHP data) can be displayed upon command on said user systems U1 and U2 in accordance with the methods set up therein. Also in FIG. 4, the signal and control lines from unit 11 to the other units present in the system 200 are represented with dotted lines. The dashed lines represent entirely optional links according to the invention, such as those regarding the audio and data streams.

In the case where the secondary information stream is a software update, the reception/reproduction system 200 can check if it is an intended recipient and if so store it and use it as provided for by the system's currently active settings. These settings can envisage that all updates be installed as soon as they become available and when the conditions of the device permit (for example, when in stand-by); or the user is notified of the existence of an update, who then decides whether to proceed with its downloading and/or its subsequent installation on the system, always when the operating conditions of the system permit.

If the system determines that the software update is destined for a device that is linked to it, whether wired or wirelessly, it can re-route it to that device.

A reception and/or reproduction system that is not compatible with the transmission system according to the invention is not able to detect and correctly use the secondary information stream F2 present in the composite video stream C. However, through opportune signalling inserted by the producer of the stream in the associated system in FIG. 3, any type of system that is able to obtain the composite Full HD frame C according to the invention from the multimedia stream can extract the 2D images present therein as well, by cutting them out of the HD frames and ignoring the remainder of its contents. The signalling can indicate, for example, that the content of the decoded HD frame to be used for video reproduction is limited to the area occupied in FIG. 1 by the images regarding video stream F1, the so-called "cropping window".

The advantages of the invention are optimal usage of the television frequency bands to simultaneously transmit multiple television broadcasting services on the same TV channel. In the case of content distribution on a storage medium, two independent streams of video content of optimal quality can be inserted (HD ready in the case of Full HD video frames) in the same multimedia file.

It is possible to extend the inventive concept by inserting three information streams in the HD frame. With reference to FIG. 2, an area of the frame in the bottom right-hand corner (region L filled with polka dots) is free, as it is not occupied by the two video streams F1 and F2. It can be used for the transmission of a software update for equipment potentially capable of receiving and/or reproducing the video contents inserted in the composite video frame C, or even for sending cryptographic keys or their periodic updating to guarantee authorized viewing of encrypted video stream(s) transmitted via the composite Full HD video frame C. In this way, together with the associated video stream F1, there would be three resulting information streams instead of two in the HD frame. Obviously, the conceptual solution can be applied to four or more information streams.

The invention has been explained with reference to the Full HD video frame, i.e. 1920×1080 pixels. However, it could be used for any video frame of predefined dimensions for inserting two or more information streams that could be transported on infrastructures and in transport files used in the present or in the future to distribute video content. For example, the next generation of video content with a 4K or 8K resolution is already being thought about, where it will be possible to use the mechanism according to the invention to distribute two or more HD and/or SD content streams opportunely combined together and downward scaled regarding definition.

The invention has been explained by way of example, starting from two 1280×720 pixel (HD ready) images, as this allows the maximum resolution of the component images for the dimensions of a Full HD (1920×1080) output frame. Nevertheless, it could equally be applied to component images with different resolutions: for example, a video stream F1 could be HD ready and the other SD (720×576), or an HD ready stream and two VGA resolution (640×480) streams could be inserted in the HD frame, in which case space would still remain for something else, for example, a software update. With reference to FIG. 5, this shows a list of the main resolutions commonly used for video images.

As stated, the encoding and encapsulation unit 4 of the production system 100 could be incorporated with the multiplexer 3 into a single processing unit; in the same way, the decapsulation and decoding unit 10 on the consumption side could be integrated with the demultiplexing unit 15.

For a person skilled in this field, many other variants are possible for transmitting video and audio content, free-to-air or encrypted, both 2D and 3D, as well as additional data, yet still remaining within the inventive concept described above and claimed hereafter.

The invention claimed is:

1. A method for generating a video stream, the method comprising:
   inserting, in a video frame at a first resolution, a first content belonging to a video stream (F1) at a second resolution lower than said first resolution of said video frame;
   inserting, in an area of the video frame formed by pixels of the video frame left free from said video stream (F1), at least a second content belonging to an information stream (F2) having, in a case where said information stream (F2) is also a video stream, a resolution equal to or less than said second resolution, where during the reproduction of one of said two video streams said video stream is shown full-screen in its entirety, or in a case said information stream (F2) is a data information stream, data encoded via a set of pixels, a number of which is less than or equal to the number of the pixels of the video frame left free by the first video stream (F1); and
   making a temporal sequence of frames formed in this way so as to constitute a composite video stream (C) comprising at least two information streams, one composed of said video stream (F1) and the other composed of said information stream (F2) with content unrelated to said video stream (F1),
   wherein said two contents can be used independently from each other through extraction from the aforesaid video frame.

2. The method according to claim 1, wherein the step of making a temporal sequence of frames comprises the steps of:
   multiplexing at least said video stream (F1) and said information stream (F2) to create the composite video stream (C); and
   encoding and encapsulating said composite video stream (C) to create a multimedia stream (FM).

3. The method according to claim 2, further comprising the steps of:
   source coding said video frames comprising said first and second contents before constituting said composite video stream
   channel encoding said composite video stream by modulating said composite video stream; and
   transmitting said modulated multimedia stream.

4. A method for reproducing a video stream constituted by a temporal sequence of video frames at a first resolution containing a first content belonging to a video stream (F1) at a second resolution lower than said first resolution, and, in an area of the video frame formed by pixels left free from said video stream (F1), at least a second content belonging to an information stream (F2) having, in a case where said information stream (F2) is also a video stream, a resolution equal to or less than said second resolution, or in a case said information stream (F2) is a data information stream, data encoded via a set of pixels, the number of which is less than or equal to the number of pixels left free by the first video stream, said method comprising the steps of:
   receiving a multimedia stream (FM);
   decapsulating and decoding said multimedia stream to obtain a composite video stream (C);

demultiplexing said composite video stream (C) to separately obtain said video stream (F1) and said information stream (F2), wherein said video stream (F1) is unrelated to said information stream (F2); and reproducing at least one of said video stream (F1) and said information stream (F2), independently from each other.

5. The method according to claim 1, wherein the video frame is of the Full HD type, and the first content and the second content are images belonging to two independent 2D video streams of lower resolution than Full HD and both are contained in the Full HD frame, and where both video streams are free-to-air.

6. The method according to claim 1, wherein the frame is of the Full HD type, and the first content and the second content are images belonging to two independent 2D video streams of lower resolution than Full HD and both are contained in the Full HD frame, and where one of the video streams is encrypted.

7. The method according to claim 1, wherein the video frame is of the Full HD type, and the first content and the second content are images belonging to two independent 2D video streams of lower resolution than Full HD and both are contained in the Full HD frame, and where both video streams are encrypted.

8. The method according to claim 1, wherein the video frame is of the Full HD type, the first content is a 2D image of lower resolution than Full HD and the second content is a software update.

9. The method according to claim 1, wherein the video frame is of the Full HD type, and the first content and the second content are images belonging to two independent 3D video streams of lower resolution than Full HD and are both contained in the Full HD frame.

10. A system for the generation and transmission of video streams constituted by a temporal sequence of video frames generated by the method of claim 1, said system comprising:
at least one source (1) of said video stream (F1);
at least one source (2) of said information stream (F2);
at least one multiplexer unit connected to said sources (1 and 2) of said video and information streams (F1 and F2) forming a sequence of composite video frames and able to forward as output a composite video stream of said video and information streams (F1 and F2);
at least one source coder source coding said sequence of composite video frames before being outputted by said multiplexer;
at least one encoder and encapsulator connected to said multiplexer unit and able to receive as input said composite video stream (C) and generate as output a multimedia stream (FM);
a modulator able to receive as input said multimedia stream (FM) and transform said multimedia stream (FM) into a form suitable for transmission via the means of transmission.

11. The system according to claim 10, further comprising a control unit connected to a command unit and to said encoder and encapsulator to enable an operator to set the composition mode of said video frame.

12. The system according to claim 10, further comprising at least one storage medium able to store said multimedia stream (FM) created by said encoder and encapsulator in the form of a multimedia file (F).

13. A system for the reproduction of video streams constituted by a temporal sequence of video frames generated by the method of claim 4, comprising:
at least one demodulator for receiving a multimedia stream (FMR), demodulating said received multimedia stream (FMR) in the form received via transmission means;
at least one decapsulator/decoder connected to said demodulator and able to decode said demodulated multimedia stream (FM) from the latter and forward as output a composite video stream (C) composed of said video stream (F1) and said information stream (F2);
at least one demultiplexer unit video connected to said decapsulator/decoder and able to separately forward as output said video stream (F1) and said information stream (F2).

14. The system according to claim 13, further comprising a control unit connected to a command unit and to said decapsulator/decoder to enable an operator to set the mode for splitting up and using said video frame.

15. The system according to claim 13, further comprising at least one storage medium able to store said multimedia stream received from a transmitter in the form of a multimedia file (F).

16. The method according to claim 4, wherein the video frame is of the Full HD type, and the first content and the second content are images belonging to two independent 2D video streams of lower resolution than Full HD and both are contained in the Full HD frame, and where both video streams are free-to-air.

17. The method according to claim 4, wherein the frame is of the Full HD type, and the first content and the second content are images belonging to two independent 2D video streams of lower resolution than Full HD and both are contained in the Full HD frame, and where one of the video streams is encrypted.

18. The method according to claim 4, wherein the video frame is of the Full HD type, and the first content and the second content are images belonging to two independent 2D video streams of lower resolution than Full HD and both are contained in the Full HD frame, and where both video streams are encrypted.

19. The method according to claim 4, wherein the frame is of the Full HD type, the first content is a 2D image of lower resolution than Full HD and the remaining space of the Full HD frame contains the second content, which is a software update.

20. The method according to claim 4, wherein the frame is of the Full HD type, and the first content and the second content are images belonging to two independent 3D video streams of lower resolution than Full HD and both are contained in the full HD frame.

\* \* \* \* \*